United States Patent [19]

Simmons

[11] 4,294,338
[45] Oct. 13, 1981

[54] TRANSMISSION SHIFT CONTROL APPARATUS WITH COUNTERSHAFT BRAKE

[75] Inventor: John P. Simmons, Muncie, Ind.

[73] Assignee: Borg-Warner Corporation, Chicago, Ill.

[21] Appl. No.: 92,886

[22] Filed: Nov. 9, 1979

[51] Int. Cl.³ .................... B60K 41/28; B60K 41/24; F16H 3/38
[52] U.S. Cl. ............................... 192/4 A; 192/18 R; 192/53 F; 74/339; 74/411.5; 188/72.1
[58] Field of Search ............... 192/18 R, 18 A, 18 B, 192/4 R, 4 A, 53 R; 188/72.1, 71.2; 74/339, 411.5, 340

[56] References Cited

U.S. PATENT DOCUMENTS

| | | | |
|---|---|---|---|
| 2,787,355 | 4/1957 | Dodge | 192/18 R |
| 3,631,952 | 1/1972 | Sugimoto et al. | 74/339 X |
| 3,745,847 | 7/1973 | Worner et al. | 74/339 |
| 4,211,313 | 7/1980 | Quick et al. | 192/18 A |

Primary Examiner—George H. Krizmanich
Attorney, Agent, or Firm—Julian Schachner

[57] ABSTRACT

Shift control apparatus for a multiple speed, sliding gear manual transmission is characterized by the provision of a main shift rail which is rotatable for crossover selection and axially slidable for engaging the selected gear. A synchronizing clutch/brake mechanism is axially slidable in one direction for engaging a forward speed ratio and in another direction for braking and releasing the transmission countershaft. A reverse idler gear is axially slidable in said one direction for engaging a reverse speed ratio. Linkage is provided for sliding the mechanism in said one direction upon axial sliding movement of the main shift rail in a first direction, and for sliding the mechanism in said other direction and the reverse idler gear in said one direction upon axial sliding movement of the main shift rail in a second direction.

16 Claims, 7 Drawing Figures

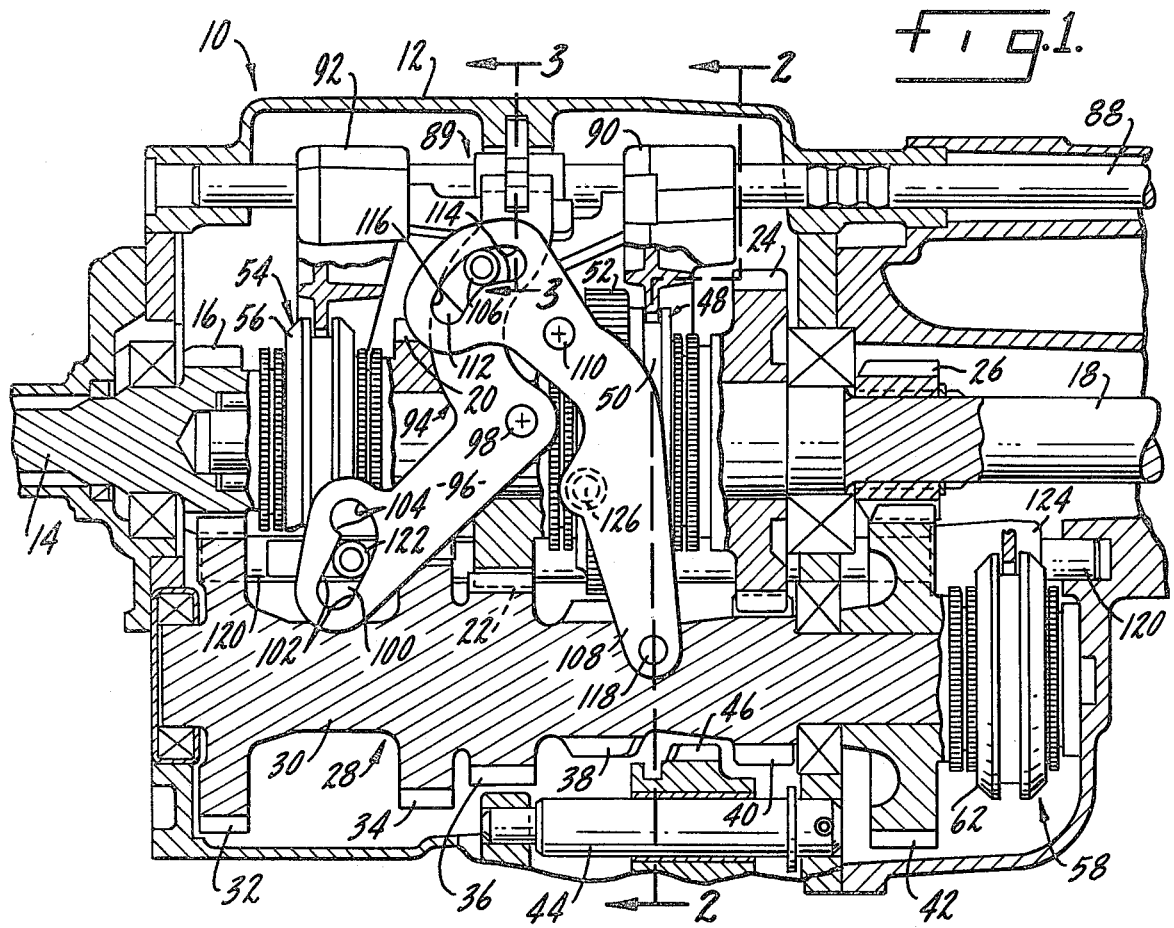
Fig. 1.
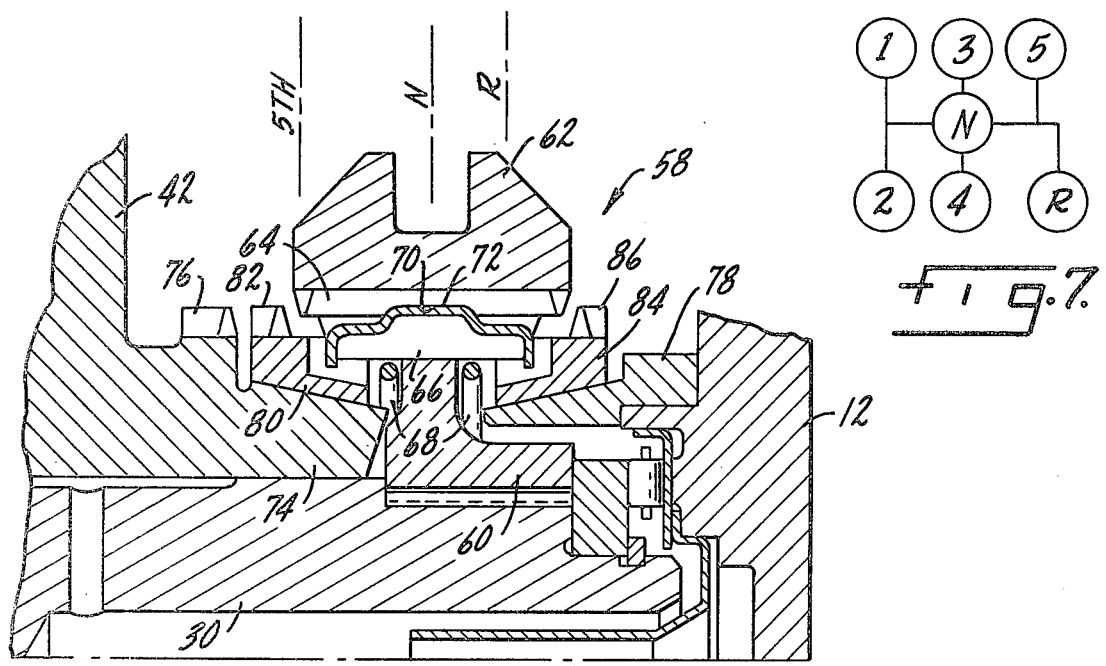
Fig. 6.
Fig. 7.

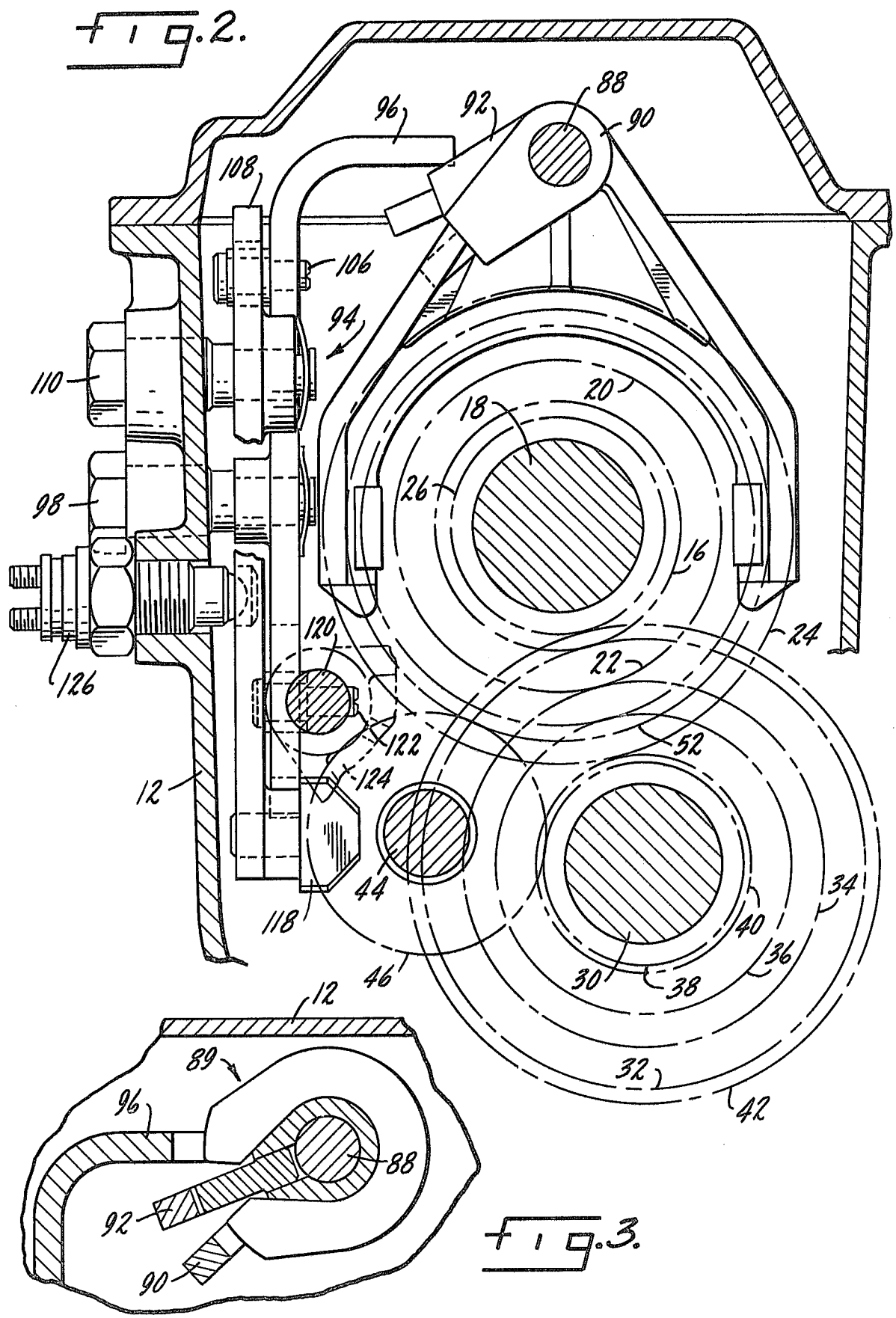

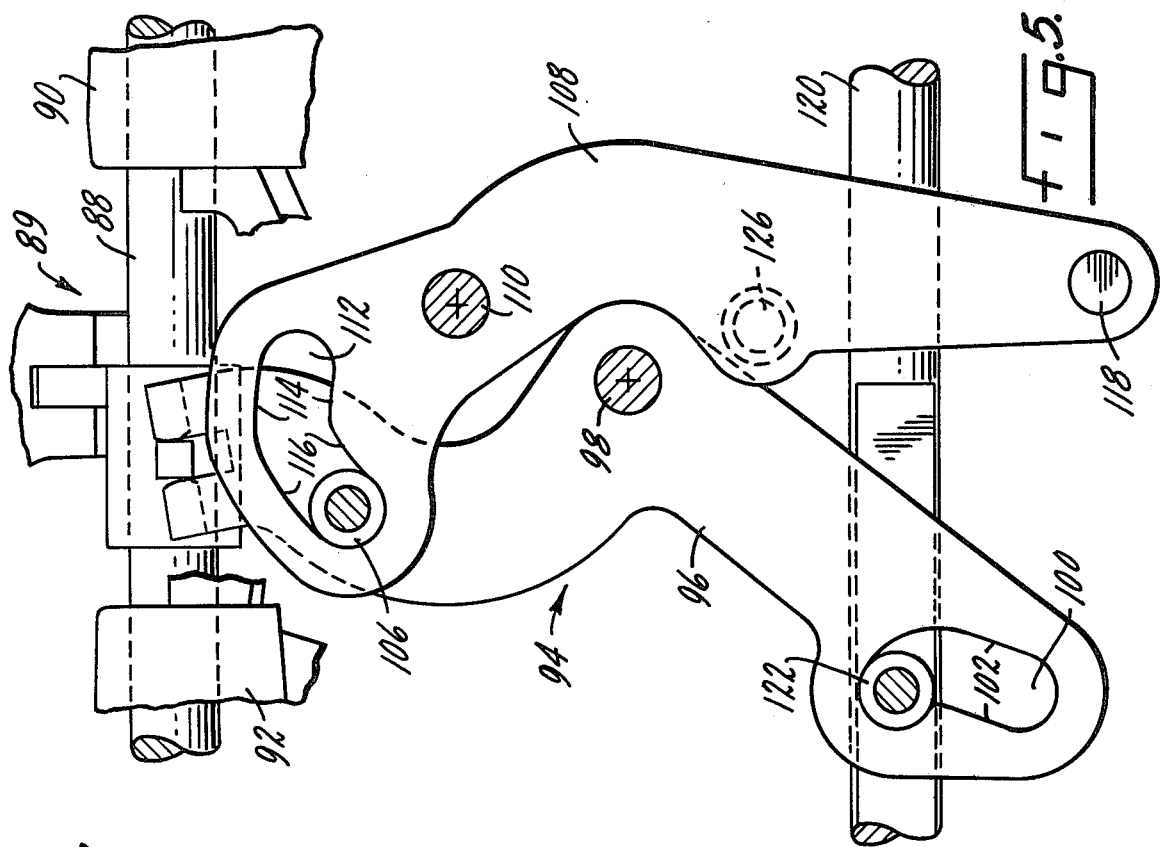
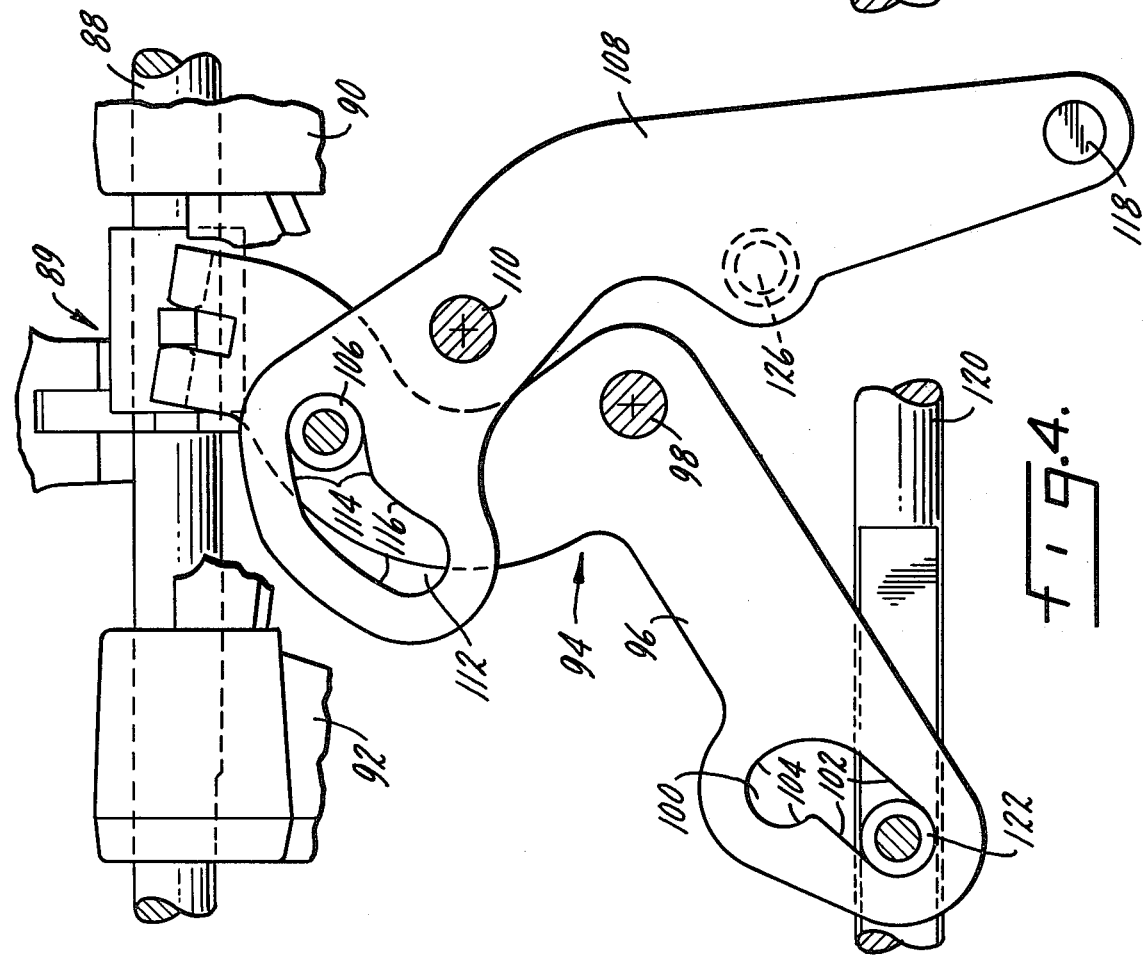

TRANSMISSION SHIFT CONTROL APPARATUS WITH COUNTERSHAFT BRAKE

BACKGROUND OF THE INVENTION

This invention relates generally to the control of an automotive transmission or the like. More particularly, it relates to improved shift control apparatus for a multiple speed, sliding gear manual transmission.

In recent years there have been many improvements in automotive drive trains, including improvements relating to control apparatus for shifting manual transmissions. Generally, for transmissions incorporating five forward speed ratios and a reverse speed ratio, the shift control apparatus provides three crossover positions for the shift stick. Each crossover position selects an appropriate shift fork, which may be moved longitudinally to engage either of two speed ratios. Of the three crossover positions, the first selects the first and second forward speed ratios, the second selects the third and fourth forward speed ratios, and the third selects the fifth forward and reverse speed ratios. Because longitudinal movement of the same shift fork in opposite directions engages either fifth or reverse, it is possible that reverse may be engaged inadvertently during the five-four downshift.

Copending U.S. application Ser. No. 968,058 filed Dec. 11, 1978 discloses shift control apparatus wherein a main shift rail is rotatable about its longitudinal axis to four positions for crossover selection. In each of these positions the main shift rail is slidable longitudinally along its axis so as to engage the selected speed ratio. In the first and second positions, the main shift rail is slidable to engage respectively either the first and second forward speed ratios or the third and fourth forward speed ratio. In the third and fourth positions, the main shift rail is slidable to engage respectively either the fifth forward or reverse speed ratio.

An auxiliary shift rail is slidable to engage fifth, and a reverse idler gear is slidable to engage reverse. The auxiliary shift rail and the reverse idler gear are coupled with the main shift rail by a linkage mechanism. The linkage mechanism is effective to move the auxiliary shift rail in a gear-engaging direction upon sliding of the main shift rail in one longitudinal direction when in the third crossover position, while at the same time preventing movement of the reverse idler gear. The linkage mechanism also is effective to slide the reverse idler gear in the same gear-engaging direction upon sliding of the main shift rail in the opposite, longitudinal direction when in the fourth crossover position, while at the same time preventing movement of the auxiliary shift rail.

When the reverse idler gear slides in the gear-engaging direction, it comes into meshing engagement with other gears in the reverse gear train. One of these other gears is rotatable with the transmission countershaft. In some instances it may be desirable to brake the countershaft before this meshing engagement takes place. Thus, there remains a need in the art for a simple, inexpensive countershaft braking mechanism which may be incorporated in transmission shift control apparatus of the type disclosed.

SUMMARY OF THE INVENTION

A primary object of this invention is to meet the need noted above. To that end, there is provided shift control apparatus which may be incorporated in a multiple speed, sliding gear manual transmission having, for example, five fully synchronized forward speed ratios and a reverse speed ratio. The apparatus includes a simple, inexpensive brake for bringing the countershaft to a stop prior to meshing engagement of the reverse idler gear in the reverse gear train.

A synchronizing clutch/brake mechanism is supported by the countershaft. Upon movement of the main shift rail in one direction, the auxiliary shift rail is moved in a gear-engaging direction. This causes the synchronizing clutch/brake to engage the fifth forward speed ratio. At the same time, the linkage mechanism prevents movement of the reverse idler gear.

Upon movement of the main shaft rail in the opposite direction, the auxiliary shift rail is moved in a braking direction. This causes the synchronizing clutch/brake to ground the countershaft to the transmission housing, thereby effectively braking the countershaft. At the same time, the linkage mechanism moves the reverse idler gear in the gear-engaging direction to sequentially engage the reverse speed ratio.

The synchronizing clutch/brake includes a modified cone which is fixed to the transmission housing. This cone has no teeth for engagement by the synchronizer sleeve spline. As a result, frictional contact between the synchronizer blocker ring and the modified cone is established when the sleeve is moved in the braking direction, but locking engagement between the sleeve and the modified cone cannot be established.

BRIEF DESCRIPTION OF THE DRAWINGS

The objects and advantages of this invention will become apparent to those skilled in the art upon careful consideration of the specification herein, including the drawings, wherein:

FIG. 1 is a cut-away view of the transmission, partially in section, showing the overall relationship of the components, with the gears revolved into the plane of the paper for clarity;

FIG. 2 is a sectional view taken along the line 2—2 of FIG. 1 showing details of the shift control apparatus, with some structure simplified or omitted for clarity;

FIG. 3 is a sectional view taken along the line 3—3 of FIG. 1 showing details of the selector mechanism, with some structure omitted for clarity;

FIG. 4 is a partial sectional view similar to FIG. 1 showing another position of the linkage mechanism;

FIG. 5 is a partial sectional view similar to FIG. 1 showing still another position of the linkage mechanism;

FIG. 6 is a sectional view showing details of the synchronizing clutch/brake mechanism; and FIG. 7 is a diagrammatic view illustrating the shift pattern as seen by an operator.

While this invention is susceptible of embodiment in many different forms, a preferred embodiment is shown in the drawings and will be described in detail. It should be understood that the present disclosure is considered to be an exemplification of the principles of the invention, and is not intended to limit the invention to this embodiment.

DESCRIPTION OF A PREFERRED EMBODIMENT

Referring now to the drawings in greater detail, there is shown generally a multiple speed, sliding gear manual transmission 10 adapted for use in an automotive vehicle. Transmission 10 includes a transmission housing 12. An input shaft 14 is journalled in housing 12 and is adapted to receive torque from an associated engine through an appropriate clutch. Input shaft 14 defines an input gear 16.

An output shaft in the form of a mainshaft 18 is journalled in housing 12. Output gears 20, 22 and 24 are journalled on mainshaft 18. Another output gear 26 is secured to mainshaft 18.

A cluster gear 28 includes a countershaft 30 journalled in housing 12. Defined by countershaft 30 is a drive gear 32 in mesh with input gear 16. Similarly, there are provided a countershaft gear 34 in mesh with output gear 20, a countershaft gear 36 in mesh with output gear 22, a countershaft gear 38, and a countershaft gear 40 in mesh with output gear 24. In addition, a countershaft gear 42 is journalled on countershaft 30 and is in mesh with output gear 26.

A reverse idler shaft 44 is supported in housing 12. A reverse idler gear 46 is journalled on shaft 44 and is slidable relative thereto.

A first synchronizing clutch 48 is supported by mainshaft 18 between gears 22 and 24. Synchronizer 48 includes a sleeve 50 which defines an output gear 52. Gears 38 and 52 are in alignment when sleeve 50 is in its neutral position, such that reverse idler gear 46 is slidable into and out of mesh with them.

A second synchronizing clutch 54 is supported by mainshaft 18 between gears 16 and 20. Synchronizer 54 includes a sleeve 56.

As shown in FIGS. 1 and 6, a synchronizing clutch/brake mechanism 58 is supported by countershaft 30 between gear 42 and housing 12. Synchronizing clutch/brake 58 includes a hub 60 secured to countershaft 30. A sleeve 62 is engaged with hub 60 by a toothed spline 64 for rotation with and axial sliding movement relative to countershaft 30. Hub 60 is formed with spaced recesses within which are situated synchronizer struts or thrust bars 66. These struts 66 are urged outwardly by radially expanding springs 68. The internally splined periphery of sleeve 62 is formed with a detent groove 70 engaged by cooperating projections 72 formed on the outer surfaces of struts 66. Thus, a spring-loaded break-away detent connection is established between sleeve 62 and struts 66.

Gear 42 defines a first synchronizer cone 74 and a set of clutch teeth 76. A second synchronizer cone 78 is fixedly secured to housing 12. Cone 78 has no clutch teeth.

A first blocker ring 80 is situated between sleeve 62 and cone 74. Blocker ring 80 defines a first set of blocker teeth 82. A second blocker ring 84 is situated between sleeve 62 and cone 78. Blocker ring 84 defines a second set of blocker teeth 86.

As sleeve 62 moves forwardly (to the left as shown in FIGS. 1 and 6) struts 66 exert an axial force on blocker ring 80, which in turn frictionally contacts cone 74. A limited amount of rotary lost motion between sleeve 62 and blocker ring 80 is provided for. As struts 66 engage blocker ring 80, the ring 80 will be shifted angularly if countershaft 30 and gear 42 are rotating at different speeds. At this time, teeth 82 become misaligned with respect to the teeth of spline 64. Further forward movement of sleeve 62 is blocked.

When countershaft 30 and gear 42 are rotating in synchronization, a slight torque reversal occurs and teeth 82 become aligned with respect to the teeth of spline 64. Upon continued forward movement of sleeve 62, the teeth of spline 64 move past teeth 82 into locking engagement with teeth 76, thereby establishing a positive driving connection between countershaft 30 and gear 42. The break-away connection between sleeve 62 and struts 66 yields upon this continued forward movement of sleeve 62, and frictional contact of blocker ring 80 with cone 74 is relieved.

As described thus far, the clutching action of mechanism 58 is conventional in the power transmission art. Further detailed description is believed to be unnecessary.

The braking action of mechanism 58 takes place as sleeve 62 moves rearwardly (to the right as shown in FIGS. 1 and 6). Struts 66 exert an axial force on blocker ring 84, and frictional contact is established between blocker ring 84 and cone 78. A limited amount of rotary lost motion between sleeve 62 and blocker ring 84 is provided for. As struts 66 engage blocker ring 84, the ring 84 will be shifted angularly if countershaft 30 and housing 12 are not in synchronization. At this time, teeth 86 become misaligned with respect to the teeth of spline 64, and further rearward movment of sleeve 62 is blocked.

Countershaft 30 and housing 12 will be in synchronization when the rotational speed of countershaft 30 is zero. At this time, a slight torque reversal occurs and teeth 86 become aligned with respect to the teeth of spline 64. Upon continued rearward movement of sleeve 62, the teeth of spline 64 move past teeth 86 but do not engage cone 78. Thus, no locking engagement with housing 12 takes place. At the same time, the break-away connection between sleeve 62 and struts 66 yields, and the frictional contact of blocker ring 84 with cone 78 is relieved. Countershaft 30 has been braked and then released, and is now free to rotate once again.

A first, main shift rail 88 is supported in housing 12 for rotation about and longitudinal sliding movement along its own axis. A suitable crossover selector mechanism 89 is associated with shift rail 88. Suitable shift forks 90 and 92 also are associated with shift rail 88 and selector mechanism 89, and are respectively in driving engagement with sleeves 50 and 56 of synchronizers 48 and 54. Selector mechanism 89 and shift forks 90 and 92 may be, for example, of the type disclosed in U.S. Pat. No. 3,929,029 issued Dec. 30, 1975.

A linkage assembly 94 includes a first, drive lever 96 pivotally supported on a fulcrum 98 extending inwardly of housing 12. Lever 96 defines a first cam slot 100. Cam slot 100 has as one portion thereof first wedging surfaces 102, and as another portion thereof first non-wedging surfaces 104 with a center of curvature on fulcrum 98. Lever 96 also defines a cam actuator in the form of a roller 106 or the like.

Linkage assembly 94 also includes a second, follower lever 108 pivotally supported on a fulcrum 110 extending inwardly of housing 12. Lever 108 defines a second cam slot 112. Cam slot 112 has as one portion thereof second non-wedging surfaces 114 with a center of curvature on fulcrum 98 of lever 96 when linkage assembly 94 is in a neutral, intermediate position as shown in FIG. 1. In this position, lever 108 is locked and cannot pivot. Cam slot 112 has as another portion thereof second wedging surfaces 116. As best shown in FIG. 2, a suitable pad 118 extends from lever 108 into driving relationship with reverse idler gear 46.

A second, auxiliary shift rail 120 is supported in housing 12 for longitudinal sliding movement along its own axis. A cam follower in the form of a roller 122 is carried by shift rail 120 and extends into cam slot 100 of lever 96. A shift fork 124 also is carried at one end of shift rail 120 and is in driving engagement with sleeve 62 of mechanism 58.

As disclosed in the aforementioned U.S. application Ser. No. 968,058, main shift rail 88 is rotatable between first, second, third, and fourth crossover positions. In the first two positions, selector mechanism 89 is in alignment respectively with shift forks 90 and 92. In both the third and fourth positions, selector mechanism 89 is in alignment with lever 96. Once crossover selection has been made, longitudinal movement of shift rail 88 will engage the selected gear in the shift pattern illustrated in FIG. 7.

In the first crossover position, rearward movement of shift rail 88 moves shift fork 90 and sleeve 50 rearwardly to engage the first speed ratio. Similarly, forward movement of shift rail 88 moves shift fork 90 and sleeve 50 forwardly to engage the second speed ratio. In the second crossover position, rearward or forward movement of shift rail 88 respectively moves shift fork 92 and sleeve 56 rearwardly or forwardly to engage the third or fourth speed ratio.

In the third crossover position, rearward movement of shift rail 88 pivots lever 96 clockwise about fulcrum 98 from the neutral position shown in FIG. 1 to a first position shown in FIG. 4. Wedging surfaces 102 of cam slot 100 wedge roller 122 forwardly. Shift rail 120, shift fork 124 and sleeve 62 are moved forwardly, and mechanism 58 engages the fifth speed ratio. Due to the fact that surfaces 114 of cam slot 112 have a center of curvature on fulcrum 98, lever 108 remains locked in the neutral position. Reverse idler gear 46 cannot move.

In the fourth crossover position, forward movement of shift rail 88 pivots lever 96 counterclockwise about fulcrum 98 to a second position shown in FIG. 5. Wedging surfaces 102 wedge roller 122 rearwardly. Shift rail 120, shift fork 124 and sleeve 62 are moved rearwardly, and mechanism 58 first brakes and then releases countershaft 30. Roller 106 moves into wedging contact with surfaces 116, thereby pivoting lever 108 clockwise about fulcrum 110 from the neutral position shown in FIG. 1 toward a third position shown in FIG. 5. Non-wedging surfaces 104 accommodate slight additional pivotal movement of lever 108 to this third position, such that reverse idler gear 46 is moved into mesh with gears 38 and 52 after countershaft 30 has been braked and released. Lever 108 actuates a conventional reverse light switch 126.

Thus it will be seen that rearward movement of shift rail 88 in the third crossover position causes forward movement of mechanism 58 to engage the fifth speed ratio. Forward movement of shift rail 88 in the fourth crossover position causes rearward movement of mechanism 58 first to brake countershaft 30 by grounding it frictionally to housing 12 and then to release countershaft 30. This forward movement of shift rail 88 also causes forward movement of reverse idler gear 46 to engage the reverse speed ratio.

As disclosed herein, a conventional synchronizing clutch may be modified simply and inexpensively to serve as a synchronizing clutch/brake mechanism. The addition of a conventional blocker ring and a simplified cone without clutch teeth is all that is required for the modification.

It should be understood that while a preferred embodiment of the invention has been shown and described, this is to be considered as illustrative and may be modified by those skilled in the art. It is intended that the claims herein cover all such modifications as may fall within the spirit and scope of the invention.

What is claimed is:

1. Apparatus comprising a ground member, a shaft rotatable relative to said member, a sleeve rotatable with and slidable relative to said shaft, said sleeve defining a spline, at least one thrust-transmitting strut in break-away connection with said sleeve for rotational and sliding movement therewith, and a blocker ring in rotational lost-motion connection with said strut adjacent said member, said blocker ring defining blocker teeth rotatable into and out of alignment with said spline, said sleeve being slidable for sliding said strut into thrust-transmitting engagement with said blocker ring such that said blocker ring establishes frictional braking contact with said member and said blocker teeth rotate out of alignment with said spline, said blocker teeth being rotatable into alignment with said spline upon braking of said shaft such that said sleeve is further slidable to release said break-away connection and thereby release said shaft for further rotation.

2. The apparatus of claim 1, further comprising a gear journalled on said shaft, said gear defining clutch teeth, another blocker ring in rotational lost-motion connection with said strut adjacent said gear, said other blocker ring defining other blocker teeth rotatable into and out of alignment with said spline, said sleeve also being slidable for sliding said strut into thrust-transmitting engagement with said other blocker ring such that said other blocker ring establishes frictional synchronizing contact with said gear and said other blocker teeth rotate out of alignment with said spline, said other blocker teeth being rotatable into alignment with said spline upon synchronization of said shaft and said gear such that said sleeve is further slidable into positive driving engagement with said clutch teeth.

3. In a synchronizing clutch/brake mechanism, a non-rotatable member, first and second rotatable members, first and second synchronizer elements drivingly associated with said first member and shiftable for establishing frictional contact respectively with said second and non-rotatable members, and drive means drivingly connected to said first member and shiftable in one direction relative thereto for sequentially establishing frictional synchronizing contact of said first element with said second member and a positive drive connection between said first and second members, said drive means being shiftable in another direction relative to said first member for sequentially establishing frictional braking contact of said second element with said non-rotatable member and release thereof.

4. In a transmission having a housing, a shaft rotatable relative to said housing, and a gear rotatable relative to said shaft; a synchronizing clutch/brake mechanism comprising a first cone and a set of clutch teeth defined by said gear, a second cone secured to said housing, a sleeve and strut means rotatable with and axially slidable relative to said shaft, said sleeve and strut means being coupled by a break-away connection, and first and second blocker rings respectively between said sleeve and said first and second cones, said first and second blocker rings having limited angular displaceability relative to said sleeve, said sleeve and strut means being slidable in a first direction such that said strut means effects frictional contact of said first blocker ring with said first cone to thereby bring said shaft and gear into synchronization and then to effect rotational locking engagement of said sleeve with said clutch teeth, said sleeve and strut means being slidable in a second direction such that said strut means effects frictional contact of said second blocker ring with said second cone to thereby brake said shaft and then relieve said frictional contact to thereby allow said shaft to rotate.

5. In a multiple speed ratio power transmission having a housing, an input shaft, a countershaft, and an output shaft, gears defining a plurality of forward speed ratios and a reverse speed ratio selectively engageable for establishing torque delivery paths between said input and output shafts, and shift control means for selectively engaging said speed ratios; the improvement wherein said shift control means comprises first engaging means including synchronizing clutch/brake means slidable in one direction for engaging a forward speed ratio and in another direction for braking said countershaft, second engaging means slidable in an engaging direction for engaging a reverse speed ratio, and linkage means for sliding said synchronizing clutch/brake means in said one direction and for simultaneously sliding said synchronizing clutch/brake means in said other direction and said second engaging means in said engaging direction.

6. The invention of claim 5, said engaging direction being said one direction.

7. The invention of claim 6, said linkage means including a first lever pivotal about a first fulcrum between a first position, a neutral position and a second position, a second lever pivotal about a second fulcrum between a neutral position and a third position, said second lever being in driving relationship with said second engaging means, said levers being constructed and arranged such that said second lever is locked in said neutral position when said first lever is in said first and neutral positions, said first lever and said first engaging means defining first camming means for sliding said first engaging means in said one direction in response to pivoting of said first lever from said neutral position to said first position and in said other direction in response to pivoting of said first lever from said neutral position to said second position, and said first and second levers defining second camming means for sliding said second engaging means in said one direction in response to pivoting of said first lever from said neutral position to said second position.

8. The invention of claim 7, said second camming means effecting said locking of said second lever when said first lever is in said neutral and first positions.

9. The invention of claim 7 or 8, said first camming means including a first cam slot defined by said first lever, and a cam follower connected to said first engaging means, said first cam slot having first wedging surface means contacting said cam follower for camming said first engaging means in said one direction as said first lever pivots from said neutral position to said first position, said first wedging surface means contacting said first cam follower for camming said first engaging means in said other direction as said first lever pivots from said neutral position toward said second position, said first cam slot having first non-wedging surface means contacting said cam follower as said first lever pivots to said second position, and said second camming means including a second cam slot defined by said second lever, and a cam actuator connected to said first lever, said second cam slot having second non-wedging surface means contacted by said cam actuator as said first lever pivots between said neutral and first positions, said second cam slot having second wedging surface means contacted by said cam actuator as said first lever pivots from said neutral position to said second position for pivoting said second lever to thereby slide said second engaging means in said one direction.

10. The invention of claim 7, 8 or 9, said shift control means further comprising synchronizing clutch means slidable in said one direction for engaging other speed ratios and in said other direction for engaging still other speed ratios, and selector means rotatable into selective engagement with said synchronizing clutch means and said first lever when in said neutral position, said selector means being slidable in said one and other directions for engagement of the selected speed ratio, sliding of said selector means in said one and other directions when engaged with said first lever effecting pivoting of said first lever about said first fulcrum respectively toward said second and first positions.

11. A transmission comprising a housing, an input shaft, an output shaft, an input gear connected to said input shaft, first, second and third output gears rotatably supported on said output shaft, a fourth output gear secured to said output shaft, a countershaft, drive, first, second, third and reverse countershaft gears secured to said countershaft with said drive gear engaging said input gear and said first, second and third countershaft gears respectively engaging said first, second and third output gears, a fourth countershaft gear rotatably supported on said countershaft and engaging said fourth output gear, a first synchronizing clutch supported by said output shaft and including a first sleeve shiftable in first and second directions respectively for connecting said first and second output gears to said output shaft, a reverse output gear secured to said first sleeve, a second synchronizing clutch supported by said output shaft and including a second sleeve shiftable in said first and second directions respectively for connecting said third output gear and said input gear to said output shaft, a synchronizing clutch/brake supported by said countershaft and including a third sleeve shiftable in said first and second directions respectively for braking said countershaft and connecting said fourth countershaft gear to said countershaft, a reverse idler shaft, a reverse idler gear rotatably supported on said reverse idler shaft and shiftable in said second direction for engagement with said reverse countershaft gear and said reverse output gear, and means for shifting said first and second synchronizing clutches, said synchronizing clutch/brake and said reverse idler gear selectively in said first and second directions.

12. Apparatus comprising a non-rotatable member, a rotatable member, and means associated with one of said members and shiftable in one direction for sequentially establishing and releasing braking engagement of said members such that said rotatable member is sequentially braked and released.

13. The invention of claim 12, said means including an element associated with one of said members, said element being shiftable in said one direction for establishing frictional braking contact with the other of said members, and another element associated with one of said members, said other element being shiftable in said one direction for sequentially shifting and releasing said element such that said rotatable member is sequentially braked and released.

14. The invention of claim 13, said element and other element being associated with said rotatable member, and said element and other element being shiftable toward said non-rotatable member.

15. The invention of claim 14, said apparatus further comprising an additional rotatable member, and an additional element associated with said rotatable member, said additional element being shiftable toward said additional rotatable member for establishing frictional synchronizing contact therewith, said other element being shiftable toward said additional rotatable member for sequentially shifting said additional element and establishing a positive driving connection between said rotatable members such that said additional rotatable member is sequentially synchronized with and drivingly engaged with said rotatable member.

16. A transmission comprising a housing, a shaft rotatable relative to said housing, and a brake mechanism, said brake mechanism including a cone secured to said housing, a sleeve rotatable with said shaft and slidable to a position spaced from said cone, a strut coupled to said sleeve by a break-away connection, and a blocker ring, said sleeve being slidable toward said position such that sequentially said strut effects frictional contact of said blocker ring with said cone to thereby brake said shaft and then said break-away connection yields to relieve said frictional contact and thereby free said shaft for rotation.

* * * * *